United States Patent Office 2,702,720
Patented Feb. 22, 1955

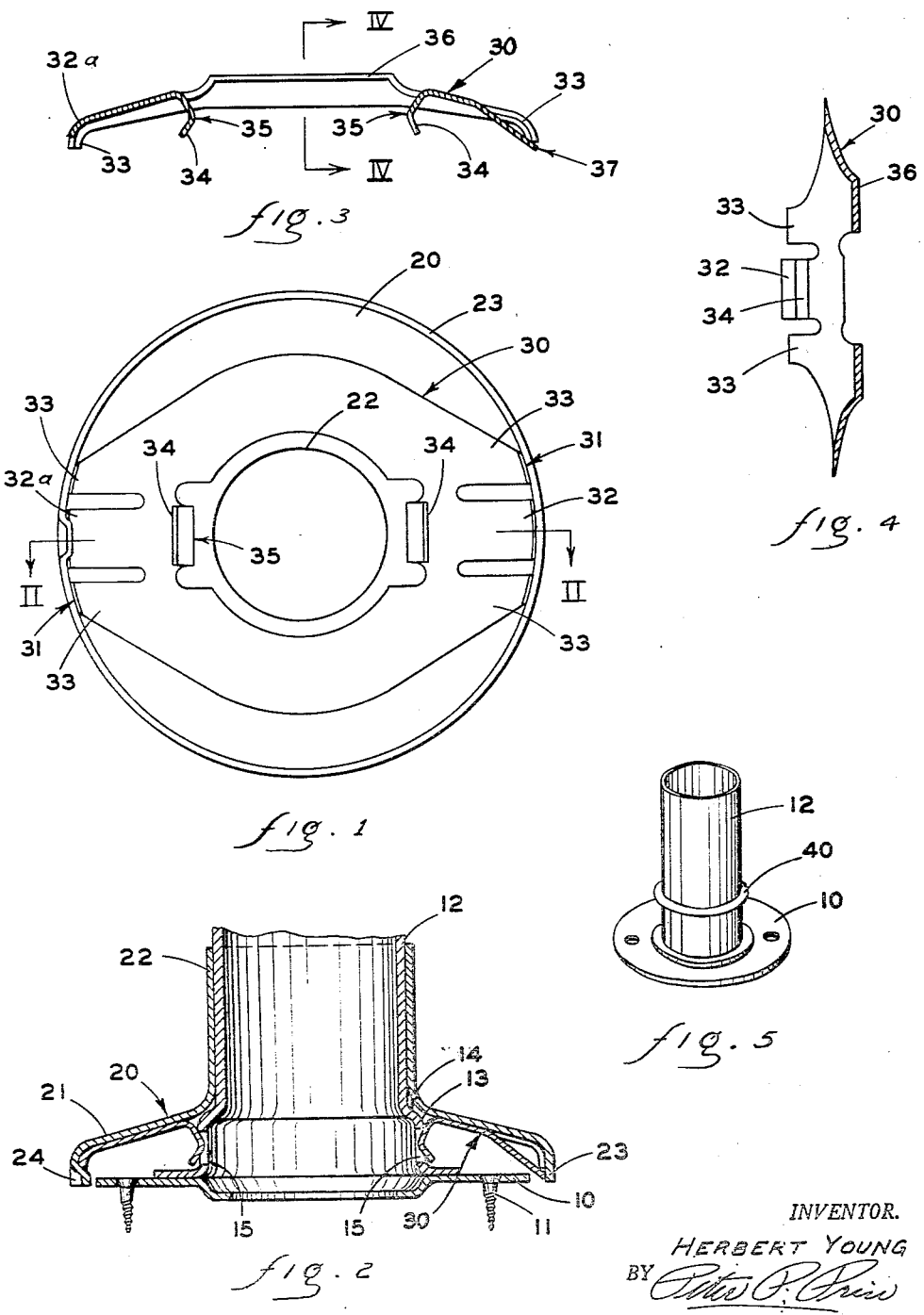

2,702,720

CONCEALED SNAP TYPE ANCHOR FOR ROSE PLATES

Herbert Young, Grand Rapids, Mich.

Application March 1, 1952, Serial No. 274,431

4 Claims. (Cl. 292—357)

This invention relates to hardware for doors and more particularly to a concealed, snap fastening for detachably securing an escutcheon or rose plate to a door.

Since hardware for doors must necessarily have an ornamental exterior, the exposed parts of such hardware are either of brass or aluminum. Brass and aluminum, while producing a highly desirable exterior finish and a corrosion resistant casing for the internal structure of the hardware, have certain undesirable characteristics requiring special designs in order to incorporate them into a standard structure. Both of the materials, in order to meet the fabricating conditions common to the manufacture of this type of structure, must be used either as a substantially pure metal or in the form of highly ductile alloys. Such forms of brass and aluminum have no resiliency and, therefore, any mounting structure for parts fabricated from these metals must depend upon steel where any type of snap attachment is desired. Furthermore, both of these metals are relatively expensive and thus must be used sparingly. To reduce material costs, parts fabricated from these metals are made from thin gauge stock, reliance is placed upon a lower cost, internal steel reinforcing structure to provide the necessary strength. Although the welding of steel to brass is not particularly difficult, finishing of the exterior surface of the brass after welding materially increases the cost of the finished product. In the case of aluminum, there is no known process for welding aluminum to steel. Therefore, the resilient steel parts must be frictionally attached to the aluminum casing in order to avoid this difficulty.

In the design of lock hardware, because of its ornamental appearance, it is desirable to conceal all functional elements whereby an uninterrupted surface will be presented. In the design of such concealed functional parts the resulting structure must be inexpensive and simple to fabricate and capable of installation by an unskilled worker.

It is the object of my invention to provide concealed means for detachably securing an escutcheon or rose plate to the stationary structure of a door handle by an entirely concealed, inexpensive means meeting all of the requirements outlined above.

Other purposes and advantages of my invention will be immediately seen by those acquainted with the design and fabrication of hardware for doors upon reading the following specification and the accompanying drawings In the drawings:

Figure 1 is an elevation view of the interior of a rose plate equipped with my invention.

Figure 2 is a sectional view of the inward end of the mounting structure for a door knob showing my invention in secured position, said view being taken along the plane II—II of Figure 1.

Figure 3 is a central, sectional view through the anchor plate for the rose plate taken along the same plane as Figure 2.

Figure 4 is a sectional view taken along the plane IV—IV of Figure 3.

Figure 5 is a fragmentary view of a modified design for the base to which a rose plate equipped with my invention is anchored.

Basically, my invention consists of a generally cylindrical base structure secured to the face of a door. A pair of openings are provided in this base adjacent the door. The rose plate has fitted within it and bearing against its internal surface an anchor plate of resilient material, the anchor plate being equipped with a pair of friction snaps designed to engage the openings in the base. The rose plate is mounted by pushing it axially on the outwardly projecting, cylindrical extension of the base until the snaps on the anchor plate seat within the openings in the side of the base. The rose plate may be removed merely by prying it up until these snaps disengage. The resilient anchor plate is secured to the rose plate by a pair of oppositely positioned prongs which, by their resiliency, embed themselves in the walls of the rose plate.

In the following description the terms "inwardly" and "outwardly" are frequently used and are to be taken to mean "inwardly" toward the face of the door and "outwardly" away therefrom.

Referring to the drawings, the numeral 10 indicates a base plate adapted to be mounted upon the face of a door by screws 11 (Figure 2). Rigidly secured to the base plate 10 is an outwardly extending, tubular column or shank 12. The shank 12 has a collar portion 13 adjacent the base plate 10 of greater diameter than the rest of the shank. Adjacent the shoulder 14 at the outward end of the collar portion 13, a pair of diametrically positioned apertures 15 are provided in the wall of the shank. The base plate 10 and shank 12 are shown as two parts assembled by suitable means such as welding. It will be recognized that, for the purposes of my invention, the base plate and shank may be formed from a single piece of material.

Seated over and enclosing the base plate 10 and substantially all of the shank 12 is a hollow escutcheon or rose plate 20. The rose plate 20 has a radially flared hood portion 21 at its inward end and a tubular portion 22 at its outer end. The tubular portion may be of substantial length, as shown, or it may be only of sufficient length to meet and seat around the shank 12. Preferably, it is of the greater length and closely but slidably seats around the shank 12 whereby the rose plate may be held in alignment with the shank by their telescoping engagement.

The rose plate 20, at the periphery of its hood portion 21, has a flange or lip 23. This lip 23 is substantially perpendicular to the face of the door. At one point, the lip is provided with an indentation or notch 24 of a size and shape suitable for receiving the tip of a standard screw driver.

Mounted within the central cavity of the hood portion 21 of the rose plate 20 is the attachment or anchor plate 30. The anchor plate 30 is arched both longitudinally and transversely to conform to the general shape of the rose plate 20. The anchor plate is centrally apertured to receive the shank 12 therethrough. The length of the anchor plate is such that it equals the internal diameter of the rose plate, each of its ends 31 being bent inwardly to conform to the peripheral lip 23 of the rose plate (Figures 2 and 3). Each of the ends 31 is slotted in a manner to divide the end into three fingers. The center finger or prong 32 on one side is not curved to conform to the shape of the rose plate but traces a straight path and is inwardly inclined. The end of the prong 32 extends slightly inwardly of and slightly beyond the ends of the adjacent fingers or wings 33. On the other end of the anchor plate 30, the central finger or prong 32a is arched quite similarly to the adjacent wings 33 but the bent portion at the end opposite the lip 23 is shorter than the corresponding portions of these wings to permit it to seat outwardly and behind the indented notch 24.

Diametrically aligned with the prongs 32 and 32a are a pair of arms 34 extending inwardly along the side of the central aperture of the anchor plate. Each of the arms 34 is generally V-shaped, having the apex 35 of the V directed toward the center of the anchor plate. The rim 36 of the anchor plate 30 about the central aperture and between the arms 34 is flanged outwardly to reinforce the anchor plate.

The base plate 10 and shank 12 are normally fabricated of steel to provide a sturdy structural foundation for the door handle. The rose plate is fabricated from a corrosion-resistant, ornamental metal such as brass or aluminum. The anchor plate is preferably made from spring steel but could be fabricated from any other fatigue resisting, resilient material.

*Operation*

The anchor plate 30 is assembled to the rose plate 20 by pressing it into the central cavity of the hood portion 21 of the rose plate. As the anchor plate 30 seats snugly against the inside surface of the rose plate the prong 32a snaps over the indented notch 24 and lodges against the outward wall of this notch. In this position, it is firmly secured against inward movement with respect to the rose plate.

The prong 32 is arched outwardly until the end 37 of this prong is drawn into the rose plate. Upon release of the pressure arching the prong 32, its resiliency will force it into the lip 23 of the rose plate. The pressure exerted by the prong 32 will cause the end 37 to engage, or bite into this lip, creating a positive interference between the parts, securely and rigidly holding the anchor plate to the rose plate. The wings 33 on each side of the prongs 32 and 32a, by reason of their resiliency, bear outwardly against the rose plate, stabilizing the anchor plate. These wings prevent the anchor plate from rocking about the prongs 32 and 32a. It will be recognized that the anchor plate 30 may be removed by bending the prong 32 to disengage the lip 23. While the prong is so bent, the anchor plate may be lifted out.

The rose plate 20, with the anchor plate 30 secured therein, is passed over the end of the shank 12. As the rose plate 20 is passed inwardly along the shank 12, the arms 34 are spread by the shoulder 14. Upon continued inward movement, the arms are released and snap into the apertures 15. The inclined shape of the arms urges the rose plate securely against the door surface. The arms 34, together with the apertures 15 in the shank 12, constitute a pair of friction latches for securing the rose plate to the shank. Removal of the rose plate may be effected by inserting the tip of a screw driver in the notch 24 and prying the rose plate outwardly until the adjacent arm 34 disengages its mating aperture 15. The plate may then be pulled outwardly disengaging the other arm 34. To facilitate the removal of the rose plate, the notch 24 is aligned with one of the arms 34. Preferably, the apertures 15 are so placed that the notch 24 will be at the bottom of the rose plate.

It will be recognized that where the tubular portion 22 of the rose plate 20 is relatively short, an arm 34 must be used on each side of the anchor plate to securely retain the rose plate. Where, however, the tubular portion 22 is of such length that it is capable of preventing any substantial side movement of the rose plate, only one arm 34 is sufficient, the second one being unnecessary to counterbalance the side thrust involved.

My invention provides a simple and economical means for detachably securing a rose plate. The entire attachment means is adapted to complete concealment. At the same time, all difficulties normally encountered in anchoring steel parts to brass and especially to aluminum are eliminated. My invention is ideally adapted to the fabrication of a highly ornamental, low cost, door hardware.

A ring 40 may be substituted on the shank 12 for the apertures 15 (Figure 6). At the same time, the collar portion 13 of the shank, together with the shoulder 14 may be eliminated. The combination of the ring 40 with the arms 34 will produce the same result in holding the rose plate on the shank.

Various other modifications of my invention may be made, each without departing from the principle of my invention. Each of these modifications is to be considered as included in the hereinafter appended claims unless the language of these claims expressly states otherwise.

I claim:

1. Means for detachably securing a hollow rose plate to a tubular stationary base extending outwardly from a door, said means comprising: an aperture in the wall of said tubular base adjacent said door; a resilient anchor plate seated within said rose plate and extending across said plate substantially the full width thereof; a prong on each end of said anchor plate, each of said prongs adapted to engage the inner surface of said rose plate; and an arm on said anchor plate adapted to enter said aperture.

2. Means for detachably securing a hollow rose plate to a tubular stationary base extending outwardly from a door, said means comprising: a peripheral lip on said rose plate substantially perpendicular to said door; a pair of diametrically positioned apertures in the wall of said tubular base adjacent said door; a resilient anchor plate seated within said rose plate and extending across said plate substantially the full width thereof; a prong on each end of said anchor plate, each of said prongs adapted to engage the inner surface of said lip on said rose plate; and a pair of arms on said anchor plate each of said arms being adapted to enter one of said apertures.

3. Means for securing a resilient liner within the cavity of a hollow arched rose plate, said means comprising: a peripheral lip on said rose plate, said lip surrounding at least a part of said cavity; a prong on opposite ends of said liner, at least one of said prongs having its end forced into the inner surface of said lip by the confinement of said liner within said cavity; and a wing disposed on each side of each of said prongs, each of said wings being seated snugly against the inside surface of said rose plate for holding said liner against rocking movement about said prongs.

4. Means for securing a resilient liner within the cavity of a hollow arched rose plate, said means comprising: a peripheral lip on said rose plate, said lip surrounding said cavity and having an indentation in the outside surface thereof; and a prong on opposite ends of said liner, at least one of said prongs having its end forced into the inner surface of said lip by the confinement of said liner within said cavity, and the other of said prongs being seated on the projection on the inside surface of said lip which results from the formation of said indentation.

References Cited in the file of this patent

UNITED STATES PATENTS

| | | |
|---|---|---|
| 1,653,513 | Schlage | Dec. 20, 1927 |
| 2,052,053 | Menges | Aug. 25, 1936 |
| 2,148,191 | Dey | Feb. 21, 1939 |
| 2,234,097 | Tennerman | Mar. 4, 1941 |
| 2,536,494 | Erkkila | Jan. 2, 1951 |